United States Patent [19]

Larsen

[11] Patent Number: 5,276,958
[45] Date of Patent: Jan. 11, 1994

[54] METHOD OF MANUFACTURING AN ELECTROMOTOR WITH LAMINATED STATOR

[75] Inventor: Aage J. Larsen, Odense, Denmark

[73] Assignee: General Electric Company, Fort Wayne, Ind.

[21] Appl. No.: 41,448

[22] Filed: Apr. 1, 1993

Related U.S. Application Data

[62] Division of Ser. No. 744,869, Aug. 14, 1991, Pat. No. 5,223,761.

[51] Int. Cl.$^5$ .......................................... H02K 15/02
[52] U.S. Cl. ..................................... 29/596; 29/609; 310/42; 310/217; 310/218; 310/259
[58] Field of Search ................ 29/596, 609; 310/42, 310/216, 217, 218, 259, 254

[56] References Cited

U.S. PATENT DOCUMENTS

| 571,181 | 11/1896 | Wood . | |
|---|---|---|---|
| 724,484 | 4/1903 | Meston . | |
| 771,260 | 10/1904 | Meston . | |
| 893,711 | 7/1908 | Cushman . | |
| 928,037 | 7/1909 | Frost . | |
| 2,766,392 | 10/1956 | Wagner | 310/216 |
| 2,818,515 | 12/1957 | Dolenc | 310/216 |
| 3,221,195 | 11/1965 | Hoffman | 310/216 |
| 4,516,046 | 5/1985 | Mercier | 310/216 |
| 4,912,353 | 3/1990 | Kondo | 310/259 |

FOREIGN PATENT DOCUMENTS

| 207853 | 3/1909 | Fed. Rep. of Germany . |
|---|---|---|
| 873900 | 8/1961 | United Kingdom . |

*Primary Examiner*—Carl E. Hall
*Attorney, Agent, or Firm*—Ralph E. Krisher, Jr.

[57] ABSTRACT

A method of manufacturing an electric motor wherein pole pieces, made of pole laminations provided with outwardly extending projections are assembled into pole piece blocks, which are provided with stator coils premounted thereon. The pole piece blocks are secured to a stator ring made of stator laminations. The projections on the pole pieces are inserted into depressions formed in an inner wall of the stator ring and are then anchored thereto by means of anchoring rods inserted axially through passages provided in the stator ring and holes formed in the projections of the pole pieces. The projections and the corresponding depressions mating therewith are shaped by the step of forming the stator laminations which are formed such that the spaces of the projections and depressions receiving the same in assembly will occur as a result of a selective laying together of pre-assembled lamination packs. The lamination packs forming the stator ring are assembled together upon a successive, mutual turning of the pre-assembled stator lamination packs.

4 Claims, 2 Drawing Sheets

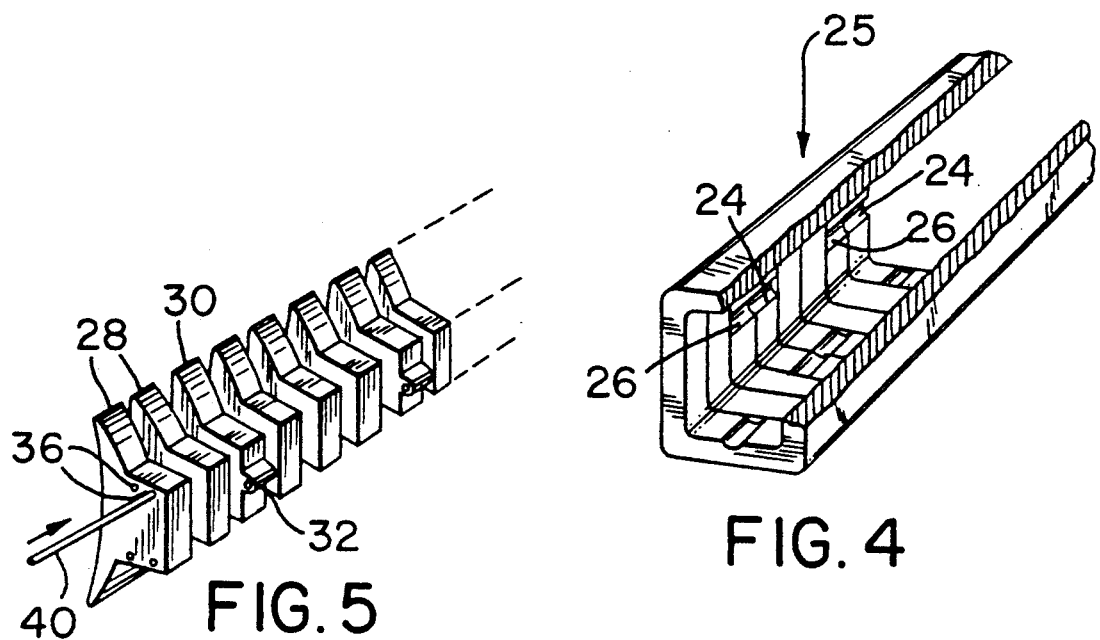
FIG. 4
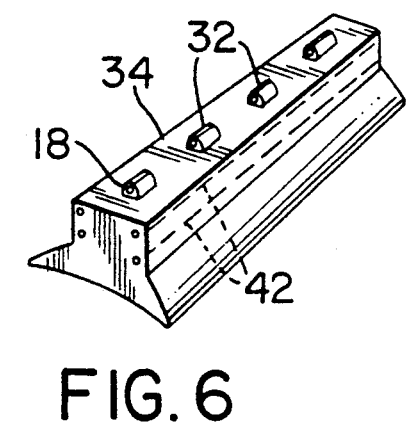
FIG. 5
FIG. 6
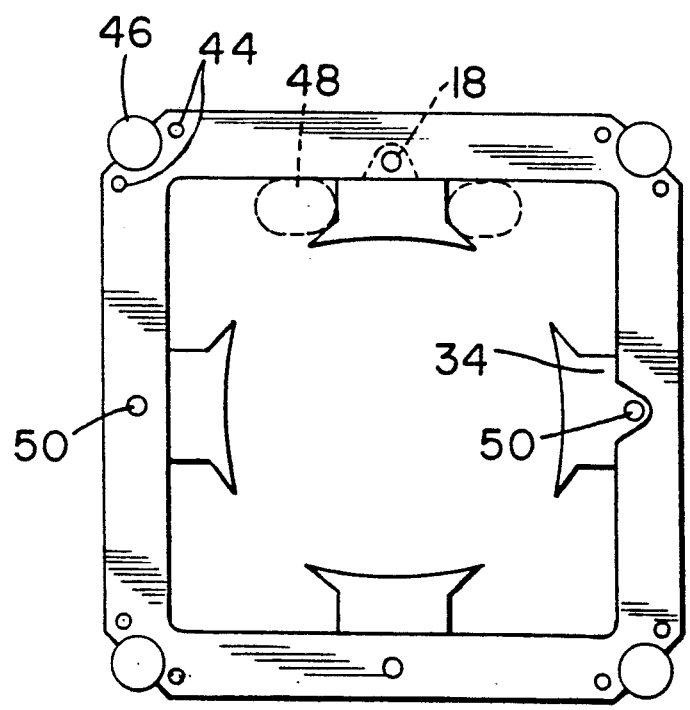
FIG. 7

METHOD OF MANUFACTURING AN ELECTROMOTOR WITH LAMINATED STATOR

This is a division of application Ser. No. 744,869, filed Aug. 14, 1991, now U.S. Pat. No. 5,223,761.

BACKGROUND OF THE INVENTION

The present invention relates to electromotors in general, and more particularly to an electromotor with a laminated stator in which a stator ring has inwardly protruding pole pieces. The pole pieces have a substantially T-shaped cross section with a shaft or foot portion projecting from the stator ring and a head portion projecting from both sides of the shaft portion and having its surface facing the rotor curved to form a cylindrical surface having a radius slightly greater than the outer radius of the rotor with which it cooperates, and being slightly spaced therefrom. Relevant stator coils are mounted on the shaft portions of the pole pieces in such a manner that they fill the space behind the rear sides of the projecting parts of the head portion.

The easier way of shaping the pole pieces is to stamp them out, together with the remaining portions of the stator laminations, from the plate material used for manufacturing of the laminated stator, such that the pole pieces will appear as inwardly projecting, integrated parts of the stator ring. This, however, incurs the essential drawback residing in that the stator coils will be mounted by being heeled over the broader head portions of the pole pieces and then narrowed about the shaft portions. However, it has been difficult to mount the coils on the pole pieces in such a way and even more difficult to change them will necessary.

It has long ago been suggested and practiced to provide the pole pieces as separate units from the stator ring and to mount the coils with a narrow shape about the shaft portions, which was easier because they were placed on the shaft portions of the poles from the narrow ends thereof, that is without being heeled over the head portions, and the coil carrying pole pieces were then mounted on the inside of the stator ring and fixed thereto in any suitable manner. The connection of the pole pieces to the stator ring could even be easily releasable, whereby it was possible to replace a burnt coil with a new one in a relatively simple manner.

However, there are considerable problems connected with the production and particularly securing of the separately made laminated pole pieces to the stator ring. Ideally the single lamination for the pole pieces should be formed in connection with the stamping out of each single stator lamination, by cutting off the inwardly projecting pole portions from the ring area along their base connection with the inner side of the stator ring, i.e. along or rather across the roots of their shaft portions. However, with this technique it is difficult to achieve an accurate and non-problematic mounting of the assembled, rodlike pole pieces on the interior side of the likewise assembled stator ring. It has been proposed to fasten the pole pieces by means of bolts introduced from the outside thereof. However, such fastening would require accurately drilled radial holes in the assembled lamination material and cutting threads in the holes of the pole pieces, which would amount to a quite difficult working. Moreover, it may have quite serious consequences for the entire motor if the spanner bolts of just a single pole piece would get loose, e.g. in case of a less qualified mounting or repair.

Furthermore, fastening of the above-described nature would also require the provision of radial passages through the stator ring or cylinder, which is undesired as this would facilitate penetration of moisture into the rotor area.

In order to avoid these problems it has already been proposed to shape the pole pieces and the single laminations thereof with protruding, narrow foot portions fitting into a corresponding recess In the inner wall of the stator ring, a corresponding recess being formed in each single stator lamination, to thereby ensure a very accurate positioning of the pole pieces, and, at the same time, achieve a safer fastening of the pole pieces using locking means that are active at the radial or lateral sides of the foot portions of the pole pieces, respectively. Such locking means can be formed by locking rods inserted through axially extending holes or opposed half holes formed in the adjacent side faces.

However, even this solution is problematic because it is hardly possible to form both the foot portions and the corresponding recesses in one operation or by stamping from one common lamination plate in such a manner that the parts can later be easily joined to each other. The foot portions should be just slightly narrower than the recesses, and for this to be possible the pole piece laminations, in practice, should be stamped out from plate or.-lamination members other than those, from which the stator ring laminations are stamped out, this incurring a heavy excess consumption of lamination plate material.

SUMMARY OF THE INVENTION

It is an object of the present invention to provide an improved electric motor.

The present invention provides for a solution which allows separate pole pieces to be prepared by a pure follow die operation on the lamination members which are stamped out for forming the stator ring and preferably also the body of the rotor, and which also enables an easy and effective fastening of the pole pieces to -the stator ring.

According to the invention the different pole parts of each single lamination member are shaped in three different manners; partly (for more than one pole piece part) by a clean cutting at the root, i.e. by cutting along the inner contour of the stator ring, partly (for at least one pole piece part) by cutting along this contour over only a part of the width of the root, while cutting at the remaining part of the width of the root into the stator ring portion so that a local bulge in the form of an ear-shaped portion provided with a hole will occur on the root line of the pole portion, this ear-shaped portion leaving a complementary recess in the inner contour of the stator ring, and partly (again for at least one pole piece) by a clean cutting of the pole piece along the root line. In the latter case, with the addition of a separate stamping out of an adjacent portion of the inner area of the stator ring portion, there is formed a notch or depression of a shape and size apt for receiving the projecting ear-shaped portion on the pole piece part mentioned above. For the same reason this notch or depression should be worked out to be of a size slightly larger than the ear-shaped portion and thus also slightly larger than the recess left by the shaping of the ear-shaped portion.

The pole portions are also provided with holes located near the sides of their shaft portions, such that the stamped off pole piece parts can be assembled together to form the laminated pole pieces. The laminated pole pieces are held together by means of anchoring rods inserted through said holes; the anchoring is effected by axially pressing together the pole piece parts in the pack and carrying out a welding along the side areas of the pack, to which the anchoring rods extend in close proximity. The pole piece parts are packed in series or blocks such that between relatively long blocks of evenly cut off pole piece parts there are interposed shorter blocks of the pole parts which were stamped out with the ear-shaped portions. These ear-shaped portions in the assembled condition of the stator pole piece are spaced-apart projecting block portions on the root surface of the pole piece.

The stamped out stator laminations are likewise assembled into block sections, which will not be different from each other since all stator laminations are similar to each other. However, adjacent block sections are angularly turned relative to each other about the stator axis in such manner that along each mounting area of a pole piece alternating block sections will be positioned, of which some sections will respectively have -non-recessed inner side portions and others will have inner side portions provided with larger and smaller recesses. In the assembled stator ring or pack these recesses will form marked depressions in the inside of the ring, and the arrangement may be such that these depressions be located in accordance with the protruding ear-shaped block portions on the pole pieces so as to receive these block portions upon the insertion of the pole pieces at the respective mounting areas of the inner side of the stator ring.

As mentioned above, the ear-shaped portions are provided with holes, which in the assembled condition of the pole piece laminations will provide axial passages to receive a holding rod therethrough. The ear-shaped block portions are spaced from each other and when the pole pieces are introduced into the assembled stator ring it is possible to secure the inserted pole pieces in the stator ring merely by introducing with more or less pressure a holding rod axially through the alternating hole passages extending through the ear-shaped block portions of the pole pieces and the holes provided in the intermediate block portions of the stator ring, respectively.

Hereby the pole pieces, with premounted stator coils introduced over the narrow root ends thereof, will be connected to the inner side of the stator ring in a very easy and advantageous manner, as there will be no need for any radial penetration of the stator ring. The connection will be easy to release merely by pulling out the axial holding rod, and it will be easy to repair a given motor by interchanging a burnt stator coil.

It is to be noted that it has been already known in the relevant field to effect a modular turning of the stamped out laminations, namely for achieving compensation for thickness variations of the laminations, i.e. the machine equipment required for such turning already exists, and in connection with the invention it should only be ensured that the turning is effected in blocks or parcels without any turning between the single lamination members in the same block.

The invention is directed to a motor, preferably a DC motor, which is made up in accordance with the new principles here disclosed. In this connection it will even be a possibility that the pole pieces be provided separately, as solid bodies, the projecting ear-shaped blocks of which may be mounted and secured in the depressions provided in the inner side of the laminated motor ring.

The aforementioned objects, features and advantages of the invention will, in part, become obvious from the following more detailed description of the invention, taken in conjunction with the accompanying drawings, which form an integral part thereof.

BRIEF DESCRIPTION OF THE DRAWINGS

FIG. 4 is a perspective view with a portion cut away, illustrating the assembled stator;

FIG. 5 is a perspective view of a row of pole blocks for forming a pole piece of the motor;

FIG. 6 is a perspective view of the assembled pole piece; and

FIG. 7 is a plan view of the assembled stator.

DETAILED DESCRIPTION OF THE INVENTION

Figure 1:
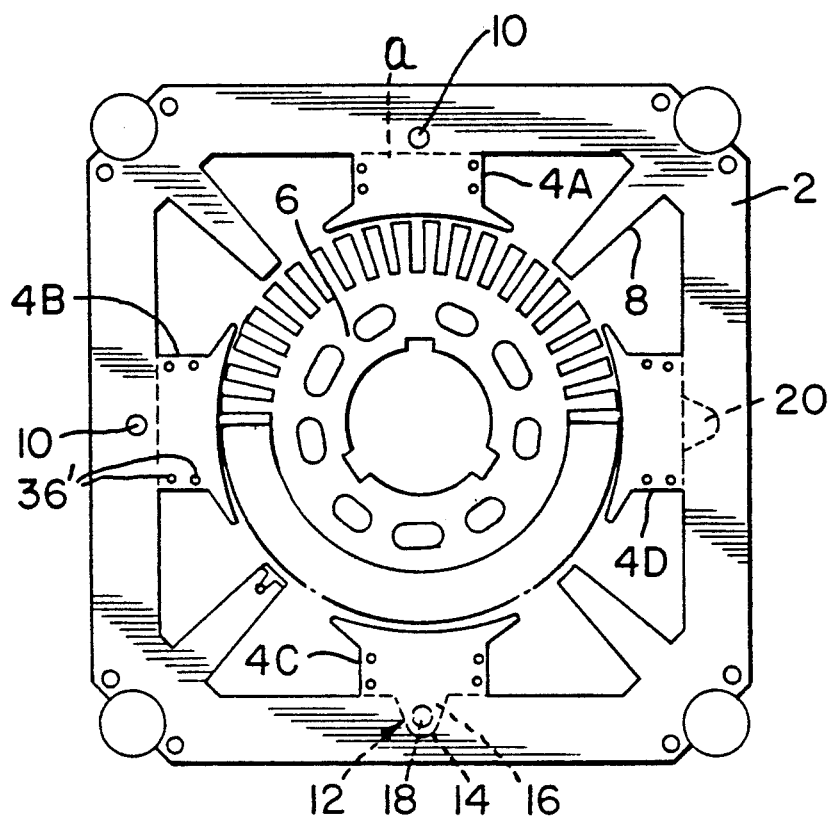
FIG. 1 is a plan view of a stator and rotor lamination member for use in a motor according to the present invention.

To manufacture a stator and a rotor of the motor according to the invention use is made of lamination members as shown in FIG. 1. The stamping lines are shown by drawn lines. The main parts of the lamination member of FIG. 1 are an outer, closed stator ring 2, pole piece laminations pieces 4A, 4B, 4C, 4D inwardly projecting from the inner surfaces of the stator ring and a central rotor part 6 having slot openings at an outer periphery thereof for receiving rotor coils. At its corners, between the pole piece lamination 4A-4D, the stator ring 2 has inwardly protruding, so-called turning poles 8, which are, however, not part of the present invention and therefore will not be described further.

By one or more initial stamping operations the central rotor part 6 as well as the interconnecting portions between the stator and the rotor parts are stamped out, and respective holes or passages 10 are stamped out in the stator ring 2 in the proximity to the pole piece lamination 4A and 4B. The pole piece laminations 4A and 4B are stamped out along the marked dash-and-dot-lines a, which extend in continuation of the inner contour of the stator ring 2. The same applies to the inner pole piece lamination designated at 4D, while the pole piece lamination designated at 4C is stamped out along a line which generally follow the inner contour of the stator ring but has a local bulging-out portion 12 at the middle of a root portion of the pole piece lamination 4C. Hereby a recess 14 will be produced at the inner side of the stator ring 2, along with an outwardly projecting ear-shaped portion 16 formed on the pole piece lamination 4C. A hole or passage 18 is stamped out in the ear portion 16.

Upon stamping out the pole piece lamination 4D along the contour line a, a recess 20 is stamped out from the inner edge of the stator ring 2. The shape of recess 20 corresponds to that of the ear-shaped portion 16 of the pole piece lamination 4C, though being slightly larger than that portion. In the following description the reference numeral 20 will be used to identify the recess produced by the stamping operation here considered.

Figure 2:
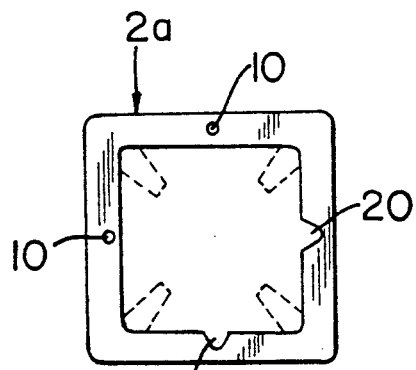
FIG. 2 is a plan view of a stamped out stator lamination for forming a stator pack.
Figure 3:
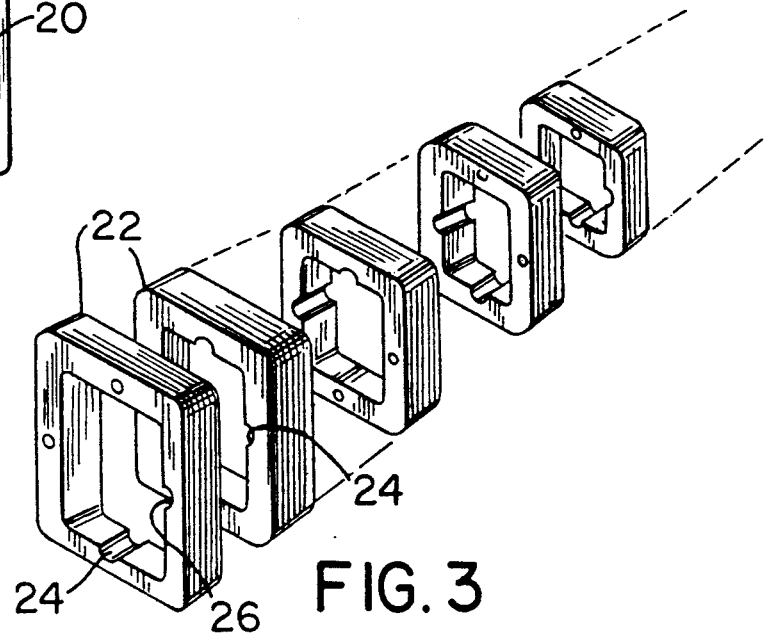
FIG. 3 is a perspective view of stator lamination blocks which are to be assembled to form the stator of the motor.

A finished stator lamination 2A is shown in FIG. 2. Typically the laminations are fully symmetrical and are assembled together into a stator pack while being turned by one pole pitch for each new lamination, but stator here the laminations 2A are not fully symmetrical. The stator laminations are assembled together without being mutually turned, into small laminations packs or subassemblied 22, as shown in FIG. 3. The small packs 22 of stator laminations in turn, are turned by one pole pitch when they are consecutively assembled together to form a complete stator ring block 25. In the conventional electric motors, the purpose of turning the laminations was to compensate for obliquities which could occur as a result of certain non-uniformities or variations in the plate thickness across the laminations. However, it should be appreciated that this problem will be solved quite as well also when the laminations are assembled with a non-changed orientation of the laminations in the small packs 22, provided that these pre-assembled small packs are turned when being laid or assembled together as shown in FIG. 3.

Packs 22 when assembled together, form stator ring block 25 as shown in FIG. 4. Packs 22 are successively turned by 90° as shown in FIG. 3, and the recesses 14 and 20 of individual will stator lamination form depressions designated 24 and 26, respectively, in otherwise smooth inner side portions of the packs 22. With the arrangement shown in FIGS. 2 and 4 the depressions 24 and 26 of packs 22 will be positioned pairwise, in mutual extension and in regularly angularly displaced positions on the respective four inner side portions of the stator ring 25. On each inner side of the stator ring block 25, the double depressions 24, 26 of two neighboring packs 22 will be located with even spacing, namely with a spacing corresponding to the width of two lamination packs or sub-assembles 22 or to the double length of the depression in each pack, of which each single depression 24, 26 constitutes one half.

The stamped out pole piece laminations are correspondingly assembled together so as to form pole packs or sub-assembles 28, 30 as shown in FIG. 5. The pole packs 28 consist of the respective pole piece laminations 4A, 4B and 4D while the packs 30 consist of the pole piece laminations 4C respectively, whereby each pole pack 30 has a protruding profile portion or protrusion 32 formed by the ear-shaped portions 16 of pole piece laminations 4C. It will be understood that it is possible to assemble pole packs 28, 30 together in suction a manner that they will form a unitary pole piece assembly or block 34 as shown in FIG. 6, in which block the spaced-apart protrusions 32 are located so as to mate respective depressions 24, 26 in the respective inner sides of the stator ring block 25. An easy reception of the protrusions 32 in the depressions 26 will be ensured in that the latter, due to the stamping of recesses 20 as described above, are slightly larger than the recesses 14 that were left by the stamped out ear portions 16.

Positioning depressions 24 and 26 in the stator ring block 25 so that they mutually extend one another will provide a sufficient space for an untroubled introduction of the protrusions 32, which can be slightly axially displaced within the so-formed double-depression 24, 26, which will permit each protrusion 32 to enter partly into the depression 24, where, due to the pointed shape of the protrusion 32, would be a sufficient space for the initial insertion of the protrusion. In practice, the mounting of tue pole piece block 34 into an accurate position in the stator ring block 25 may be effected by such a loose insertion of the protrusions 32, whereafter the pole piece block is forced to shade in the axial direction to cause a lateral engagement between the protrusions 32 and the walls of the depressions 26; then the final mounting can be effected as described below.

Prior to the aforedescribed initial assembling of the stator ring block 25 and the pole piece block 34 these parts are stabilized so as to form rigid, axially compressed bodies. The pole packs 28 and 30 can be held together by means of welding wires 40 shown in FIG. 5, which wires are inserted into through passages 36 formed by holes 36' (FIG. 1) in the shaft portions of the pole piece laminations, whereafter the entire pole piece block 34 is pressed together axially and welded at weld seams 42 (shown in FIG. 6). laid along the respective lateral portions, such that the pole piece laminations will be secured to the welding wires 40 and to each other in a conventional manner known per se. A similar technique may be used for the stator ring block 25, using, for example, stamped out passages 44 (FIG. 7) provided at the corners of the stator laminations which are here of square shape as shown. Alternatively, stay bolts 46 cooperating with suitable spanner means at the opposite ends of the stator ring can be provided, for example, along the corners of the stator ring block 25.

Upon assembling of the pole piece blocks 34, suitable stator coils 48 (FIG. 7) are placed onto the shaft portions of the pole pieces, and thereafter the thus-assembled pole pieces are attached to the inner side of the stator ring as described above.

Hereafter the pole piece blocks 34 are fastened to the stator ring block by introducing anchoring rod 50, one for each pole piece (FIG. 7), through the passages in the stator ring block formed by the holes or passage 10 in the stator laminations 2A. Each lamination is provided with only two such holes, but the recesses 14 and 20 make it possible to insert rods 50 which pass through the holes or passages 10 in those packs 22 of stator laminations which have holes or passages 10 located in arrangement with these recesses. The anchoring rods 50 wall pass freely through depressions 24, while in depressions 26 they will pass through holes or passages 18 formed in protrusions 32 which are inserted into these recesses. There the pole piece blocks 34 will be anchored to the stator ring block 25 at each of the protrusions 32.

As indicated in FIG. 7, which shows the pole piece blocks 34 in their mounted positions, holes 18 are positioned slightly closer to the base surface of the packs 30 than holes or passages 10 relative to the inner side of the stator ring block 25. If the anchoring rods 50 used for insertion into the passages formed by the holes passages 10 are pointed at their leading end, then it is possible to achieve a desirable, very strong tightening of the pole pieces against the stator ring. However, it will still be practicable to effect the removal of the anchoring rods 50 from the stator ring block 25, such that one or more pole pieces may later be disrebunted for exchange of the associated stator coils 48, should such a repair become necessary.

Thus, a rigid and yet a reasonably easily releasable fastening of the pole pieces is achieved by tile simple measure of introducing anchoring rods 50 into the holes or passages 10.

Depressions 26 will be almost totally filled by protrusions 32, while depressions 24 will remain open between the inner side of the stator ring block and the base portions of the adjacent pole packs 28. This results in an undesired air space in the magnetically conductive system, but it has been found that this disadvantage is of such minor significance that it is entirely overshadowed by the advantages connected with the present invention.

If desired it is possible to arrange for more than just a single ear-shaped portion 16 of the pole lamination, whereby, with the corresponding use more holes or passages 10 and anchoring rods 50 for each pole piece block 34, a still more rigid and stabilized tightening of the pole pieces against the stator ring block will be achievable.

It will be readily understood that the invention is not limited to the embodiment shown, because there may be fewer or more poles than the four shown, e.g. more poles on a circular stator ring.

It should be noted that it is possible to make use of inverted engagement systems, i.e. where the protrusions 32 are provided on the inner side of the stator ring block, while complementary depressions 24, 26 would be formed on the base portions of the pole pieces. In such a case, each stator lamination will have, at some areas of joining of the pole piece laminations to the stator laminations, outwardly-bulged portions which will result in forming of depressions on root edges of the shaft portions of respective pole piece laminations so that the depressions would be complementary to the bulged portions. The pole piece laminations would be then assembled into first pole packs having said depressions which would form in an assembled state depressions and second pole packs which would not have depressions. The first pole packs and the second pole packs would then be assembled into final pole pieces in which the first and second pole packs will alternate so that the depressions of the first pole packs be spaced from each other by the second pole packs. The stator laminations would be assembled into pre-assembled stator lamination packs having a uniform orientation of their outwardly bulged portions. The stator lamination packs would be then assembled into a stator ring block so that the bulged portions will form protrusions spaced from each other. After mounting the stator coils on the shaft portions of the pole pieces, the anchoring rods for securing the pole pieces to the stator ring block would be inserted through holes in the protrusions and through passages formed in the pole pieces to secure the pole pieces in the stator ring block.

It should be ensured that except holes or passages 10 and 18 in the two parts there should be a sufficient amount of material to provide for a safe holding connection by means of the anchoring rods, and it is not of any principal importance whether the holes are located inside or outside the base contour of the pole pieces. The holes may even be located in the contour line, i.e. line a (FIG. 1), crossing the hole 10, with only the hole or passage 18 being located correspondingly. The straight cuttings at the pole piece laminations 4A and B can be changed so as to have e.g. a flat outward bulging such that they will project sufficiently outside tile holes for securing the holding effect. The ear-shaped portion 16 on pole piece lamination 4C may protrude a lesser amount. Also the shape of the base of the pole lamination shall be taken into account at the pole piece laminations 4D and 4C.

It should be understood, of course, that the foregoing disclosure relates to only a preferred embodiment of the invention and that it is intended to cover all changes and modifications of the example of the invention herein chosen for the purpose of the disclosure, which modifications do not constitute departures from the spirit and scope of the invention.

I claim:

1. A method of manufacturing a stator for an electromotor, comprising the steps of forming identically shaped stator laminations, providing discrete pole piece laminations in said forming step with each pole piece lamination leaving a narrower shaft portion and a broader head portion, said stator laminations each having an interior edge which has, at some areas of joining of said pole piece laminations to said stator laminations, depressions which result in forming of projections on root edges of said shaft portions of respective pole piece laminations so that said projections are complementary to said depressions, assembling said pole piece laminations into first pole packs having said projections assembled into protrusions and second pole packs without said projections, assembling said first pole packs and said second pole packs into final pole pieces in which said first and second pole packs alternate so that said protrusions of said first pole packs are spaced from each other by said second pole packs, assembling said stator laminations into pre-assembled stator ring blocks having a uniform orientation of said depressions, assembling said stator ring blocks into a stator ring so that said depressions form elongated recesses spaced from each other, mounting stator coils on said shaft portions of said pole pieces, providing anchoring means for securing said pole pieces to said stator ring, and inserting said anchoring means through holes in said protrusions and through passages formed in said stator ring blocks to secure said pole pieces in said stator ring.

2. A method according to claim 1, wherein said depressions and said projections are produced by cutting two adjacent connecting areas in each of said stator laminations and said pole piece laminations such that each depression is somewhat larger than a complementary projection.

3. A method according to claim 1, wherein said projections are substantially of a substantially convex configuration and said depressions are of a substantially concave shape.

4. A method of manufacturing a stator for an electromotor, comprising the steps of forming identically shaped stator laminations, providing discrete pole piece laminations in said forming step with each pole piece lamination having a narrower shaft portion and a broader head portion, said stator laminations each having an interior edge which has, at some areas of joining of said pole piece laminations to said stator laminations, outwardly bulged portions which result in forming of depressions oil root edges of said shaft portions of respective pole piece laminations so that said depressions are complementary to said outwardly bulged portions, assembling said pole piece laminations into first pole packs having said depressions formed into recesses and second pole packs without said depressions, assembling said first pole packs and said second pole packs into final pole pieces in which said first and second pole packs alternate so that said recesses of said first pole packs are spaced from each other by said second pole packs, assembling said stator laminations into pre-assembled stator ring blocks having a uniform orientation of said bulged portions, assembling said stator ring blocks into a stator ring so that said bulged portions form protrusions spaced from each other, mounting stator coils on said shaft portions of said pole pieces, providing anchoring means for securing said pole pieces to said stator ring, and inserting said anchoring means through holes in said protrusions and through passages formed in said pole pieces to secure said pole pieces in said stator ring.

* * * * *